United States Patent [19]
Oguma et al.

[11] 3,954,559
[45] May 4, 1976

[54] VENTED NUCLEAR FUEL ELEMENT

[75] Inventors: Masaomi Oguma; Yasuo Hirose, both of Hitachi, Japan

[73] Assignee: Hitachi, Ltd., Tokyo, Japan

[22] Filed: Oct. 20, 1972

[21] Appl. No.: 299,438

[30] Foreign Application Priority Data
Oct. 21, 1971  Japan............................ 46-83769

[52] U.S. Cl. ............................................. 176/68
[51] Int. Cl.² ........................................ G21C 3/02
[58] Field of Search.................... 176/68, 79, 81

[56] References Cited
UNITED STATES PATENTS
3,697,377  10/1972  Gauthron............................ 176/79

FOREIGN PATENTS OR APPLICATIONS
1,581,632  3/1968  France................................ 176/68

OTHER PUBLICATIONS

Heenan et al., "A Capillary Valve for Use in Ventilation of Fast Breeder Control Rods"; Nuclear Technology, Vol. 11 No. 2, June 1971 pp. 191–205 (No.S26-85–0015 RPU).

Primary Examiner—Harvey E. Behrend
Assistant Examiner—P. A. Nelson
Attorney, Agent, or Firm—Thomas E. Beall, Jr.

[57] ABSTRACT

A vented nuclear fuel element having a plenum for accumulation of fission product gases and plug means for delaying the release of the fission product gases from the plenum, the plug means comprising a first porous body wettable with a liquid metal and a second porous body non-wettable with the liquid metal, the first porous body being impregnated with the liquid metal and in contact with the liquid metal.

6 Claims, 5 Drawing Figures

VENTED NUCLEAR FUEL ELEMENT

BACKGROUND OF THE INVENTION

The present invention relates to vented fuel elements for nuclear reactors and in particular to devices for delaying the release of fission product gases from the fuel element.

In all nuclear reactors, the fission of fissile fuel produces many radioactive fission products, among which are included in particular the gaseous fission product isotopes xenon 133, xenon 135, xenon 140, krypton 85, and krypton 89. The evolution of such gases results in increased pressure within the fuel element and the consequent swelling of the cladding unless the gases are allowed to escape. Such swelling may be sufficient at times to cause the ultimate strength of the cladding material to be exceeded, with the resulting release of dangerous radioactive material in the form of fuel and short-lived fission products into the coolant of the reactor, as well as exposure of the fissile fuel to the coolant with the possible chemical reaction therewith.

In particular, fuel elements for a fast breeding nuclear reactor are required to have more than 100,000 MWD/T of the degree of burn-up rate in order to attain the low fuel cycle cost of the fast breeding reactor of which fuel elements have expensive costs of fuel material, production, reprocessing, transport, etc. as compared with those of a light-water power reactor. The high degree of burn-up rate will necessarily produce a large quantity of the fission product gases.

In the conventional sealed fuel elements, there have been two countermeasures to an increase in the pressure within the fuel element, one of which is the employment of a large volume and another is the increasing of the thickness of the cladding tube.

The enlargement of the plenum increases the plenum length and, as a result, the whole length of the fuel element becomes larger to increase the reactor mass and the size of reactor construction and reactor housing as compared to elements and reactors without increased plenum size and of the same power rating. The increase in sizes of the reactors, etc. are economically disadvantageous.

On the other hand, an increase in thickness of the tube cladding increases thermal stress thereby reducing the safety of fuel element, in cooperation with the increase in the pressure within the fuel element due to the fission product gases. Further, in this case, the neutron economy is reduced to bring about a bad effect on the breeding ratio.

As mentioned above, for the fuel elements for the fast breeding reactor, which has the high degreee of burn-up rate and high ability, the employment of the sealed fuel element requires severe design conditions in view of economy and technique.

In order to solve the above problems, employment of a vented-to-coolant type fuel element has been investigated in the U.S., Japan, etc. in which fuel element fission product gases are allowed to release into a coolant. There have been invented and proposed different kinds of vent means. For example, there is a vent system wherein a plurality of fuel elements are connected by a single manifold to make a fuel element assembly and a large plenum is provided for each fuel element assembly, whereby the fission product gases are vented to the coolant through the plenum. Another is a system wherein a capillary tube is projected from each fuel element into a cover gas so as to vent the fission product gases to the cover gas.

There are other systems, such as, a mechanical check valve system utilizing a spring, a diving-bell system utilizing a balance between a fission product gas pressure and a coolant pressure, and a porous-plug system utilizing permeability or impermeability of a porous material with respect to the liquid metal i.e. the coolant or sealant. Among these vent systems, the diving bell system and porous plug system are noticed to have the higher possibility of realization than other sytems because they have high reliability and safety owing to their simple construction and no movable parts, and thus further have economy due to no need for complicated attachments.

In the diving bell vent system, there is no problem of material choice and the system has high reliability; however, the vent device per se becomes large and long, so that economy of this system may be remarkably deteriorated.

On the other hand, in the porous plug vent system, it is possible to make the vent system shortest, but there is a severe problem in this system that dry porous material conventionally proposed cannot satisfy the conditions that the porous plug prevent the coolant from flowing into the plenum through the porous plug and also hold up the fission product gases therein as long as possible.

In a usual fast breeding reactor which uses a mixed oxide fuel material, the permeation of a coolant or liquid sodium into the fuel element must be prevented since there occurs a severe problem due to coexistence of the fuel material and the liquid metal. Further, the fission product gases vented from the vent system should be stable nuclides or at least nuclides having a long half life, otherwise radioactivity strength in the cover gas and coolant will increase and, as a result, economy of this system becomes deteriorated since there is necessity of shielding, fission product gas removing apparatus, etc.

In order to develop porous plugs satisfying the above-mentioned conditions, different investigations have been made in many laboratories. As a result, the porous plug material usable for a vent device could not be found out that would satisfy the above requirements. In an attempt, a gas holding-up pressure of 20 psi could be obtained by employing a proous body made of sintered stainless steel having a mean pore size of 1 micron; however, it has also been found that this material is poor in its ability to prevent flow of the coolant into the fuel element. Therefore, when the reactor is stopped which will shrink the gas volume, so that the pressure within the cladding tube becomes lower than that of the coolant surrounding the fuel element, the coolant flows into the cladding tube.

SUMMARY OF THE INVENTION

An object of the present invention is to provide a vented nuclear fuel element having a vent system for accumulation of fission product gases and for preventing the flowing of a liquid metal into the fuel element.

Another object of the present invention is a vented nuclear fuel element having a vent device which has no movable parts, whereby it can be manufactured easily and has low cost as well as a long service life.

Still another object of the present invention is a vented nuclear fuel element having a simplified construction and an improved operating safety.

The present invention is concerned with a vented nuclear fuel element characterized in that a vent system comprises a first porous body wettable with a liquid metal and a second porous body non-wettable with the liquid metal, the first porous body being impregnated with the liquid metal thereby suppressing the escape of fission product gases from the vent system.

BRIEF DESCRIPTION OF THE DRAWING

The above objects and other objects and features of the present invention will be apparent from the following detailed description, taken in conjunction with the accompanying drawings in which.

DETAILED DESCRIPTION OF THE DRAWING

The present invention is based upon the inventive concept that the flowing of the liquid metal into the fuel element through vent means and the easy escape of the fission product gases are prevented or suppressed by utilizing two kinds of porous plug material each having the opposite property with respect to wettability with the liquid metal. That is, one of them, which is in contact with the liquid metal, is wettable with the liquid and another metal, which is exposed to gaseous fission products, is non-wettable with the liquid metal.

Since a porous substance is considered as a combination of a large number of capillary tubes having a certain mean diameter and maximum diameter, investigations into characteristics of porous substances used as a porous plug material involves the consideration of capillary tube action between the liquid metal and the porous plug material.

Regarding the effect of capillary tube phenomenon $\Delta P$, there is the Laplace's equation:

$$\Delta P = \gamma_L \left( \frac{1}{R_1} + \frac{1}{R_2} \right) \quad (1)$$

where $\gamma$ is a surface tension of a liquid and $R_1$ and $R_2$ are each radius of curvature of liquid surface.

Since the pore size of porous plug $\gamma/\cos\theta$ is small, $R_1$ and $R_2$ are considered equal ($=R$). Therefore, equation (1) becomes $$\Delta P = \frac{2 \gamma_L}{R} \quad (2)$$

R is calculated as $$R = \frac{\gamma}{\cos\theta}$$

from the simple geometrical relationship, where $\gamma$ is a radius of pores of the porous material and $\theta$ is an angle of contact.

After all, equation (1) is modified as:

$$\Delta P = \frac{2 \gamma_L \cos\theta}{\gamma} \quad (3)$$

Figure 1A:
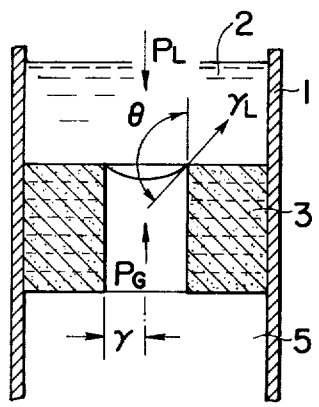
FIGS. 1a and 1b are illustrations for explaining the capillary phenomena observed in the intersurface between porous materials and a liquid metal.
Figure 1B:
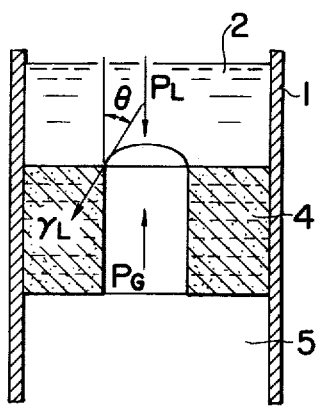

With reference to FIGS. 1a and 1b, a container 1 has a capillary tube in plug 3 or 4 that separates a gas 5 with pressure $P_G$ and a liquid 2 with pressure $P_L$. The characteristics of the porous material 3 or 4 are determined by a surface tension of a liquid metal 2 with respect to a gas 5, a pore size of the porous material and the angle of contact determined in accordance with the surface chemical condition between the porous material and the liquid metal. When the kind of liquid metal and pore size are given, the characteristics of the porous material vary with the angle of contact, angle $\theta$.

In general, when $0° \leq \theta < 90°$, the liquid metal and the porous substance are mutually "wettable"; when $90° < \theta < 180°$, they are "non-wettable". A "non-wettable" and "wettable" phenomena are respectively illustrated in FIGS. 1a and 1b.

As shown in FIG. 1b, in the case of the "wettable" material, the following condition is necessary in order to get a gas out into the liquid metal through capillary tubes.

Gas pressure $P_G \geq$ Liquid pressure $P_L$ + Capillary tube effect $\Delta P$ On the other hand, the condition required to prevent permeation of the liquid metal into the gas side is as follows:

$$P_G \geq P_L$$

where a liquid head corresponding to the length of capillary tube is neglected.

In case of "non-wettable" material as shown in FIG. 1a, a condition for releasing a gas into the liquid metal is $P_G \geq P_L$. And, a condition for preventing the flowing of the liquid metal into the gas side is $P_G \geq P_L - \Delta P$. From the above considerations, it is concluded that the wettable porous material 4 with respect to the liquid metal is suitable for increasing the period of holding-up of fission product gases in the material since the wettable porous material is impregnated with the liquid metal which obstructs the release of the gases. A non-wettable material 3 is suitable for preventing the flowing or permeation of the liquid metal into the fuel element.

The present invention is applicable not only to porous plug vented fuel elements which have a porous plug in contact with the liquid metal as a coolant such as liquid sodium, but also to so-called plug-bell type vented fuel elements in which a low melting point metal is used as an element of check valve means combined with the porous plug member. In the above two kinds of fuel elements, the porous plugs are impregnated with the liquid metal. Low melting point metals in the specification include alloys of NaK, Pb-Bi, Pb-Bi-Sn, Bi-Sn, Sn-Zn, Sn-Ag, Pb-Sn, Hg,Sn, In, Li, and the like. The following is the exemplification of the porous materials usable for the present invention. These material should be heat- and neutron-resistant so as not to be weakened during operation of the reactor.

1. "Wettable" materials with respect to liquid sodium are high nickel alloys such as Inconel, nickel treated in a reduction atmosphere, stainless steels.
2. "Non-wettable" materials with respect to liquid sodium are nickel treated in an oxygen atmosphere, zirconium surface-treated in an oxygen atmosphere, boron nitride, alumina, etc.

3. "Wettable" materials with respect to the low melting point metals (particularly to NaK) are bronze, stainless steels, etc.
4. "Non-wettable" material with respect to the low melting point metals are stainless steels (particularly with respect to Pb-Bi alloys), a silica gel, etc.

The vent system according to the present invention employs the two kinds of porous materials, one of which is impregnated with a liquid metal and in contact with the liquid metal during operation of the reactor and another is in contact with the fission product gases. Since the holding-up of the fission product gases according to the wettable porous material is attained by the capillary action of the porous material, the wettable material must be in contact with the liquid metal. It goes without saying that the objects of the present invention are attained even if the two kinds of porous materials are superimposed or mixedly combined. When the silica gel is used as a non-wettable material with respect to low melting point metals, one side of a sintered stainless steel body is submerged to be impregnated with a silica sol so as to form a non-wettable layer of silica gel on one face of the sintered body.

Further, the porous vent system according to the present invention can be constructed by multiplying the two kinds of porous material so as to increase the holding-up pressure and the permeation prevention ability, for example by stacking.

The present invention will be explained in accordance with the detailed examples.

EXAMPLE 1

As a "wettable" material with respect to liquid sodium a sintered porous body of a stainless steel of which the main alloying elements are Ni 10–14% and Cr 16–18% and as a "non-wettable" material a sintered porous body of alumina were chosen to make a composite porous plug according to the present invention. With reference to this composite porous plug the ability of gas holding-up and ability of liquid metal permeation prevention were examined.

Figure 2:
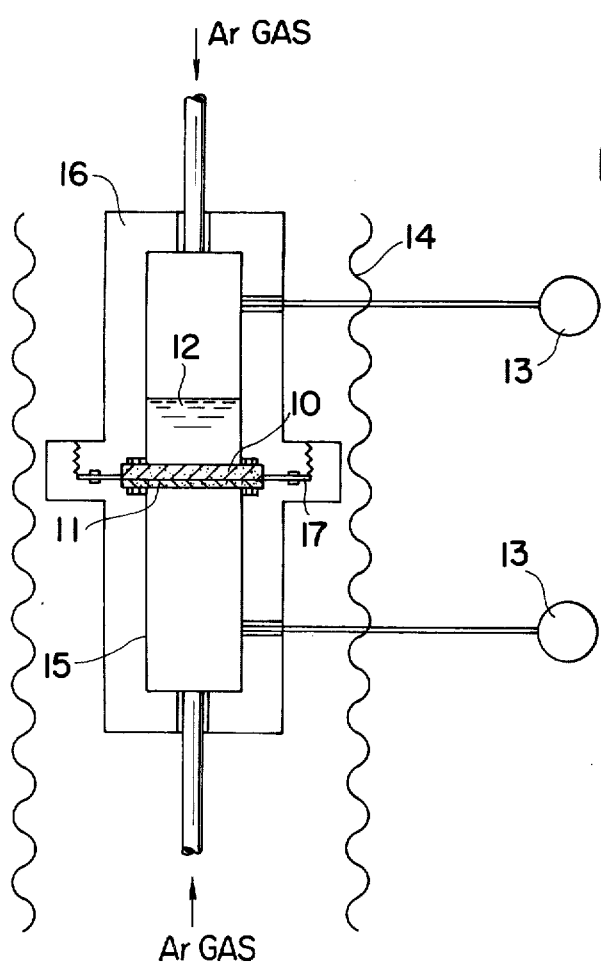
FIG. 2 is a sketch for explaining a test method of determining characteristics of porous materials.

The sintered porous disk plates of stainless steel and alumina had one micron and 0.5 micron of mean pore size and 2mm and 10mm thick, respectively. The stainless steel disk 10, with reference to FIG. 2, was sufficiently wetted in a heating vessel 15 with liquid sodium 12 by passing the liquid sodium 12 through the disk with pressure of argon gas. The thus prepared stainless steel disk 10 was closely contacted with the alumina disk 11 and the periphery thereof was soldered. The resulting composite plug was then fixed by an attachment 17 to the central portion of a cylindrical pressure vessel 15 as shown in FIG. 2.

Argon gas was charged under the composite plug 10, 11 and liquid sodium 12 was charged above the composite plug and the remaining space in the vessel was charged with argon gas. The argon gas was pressurized by a suitable pressurizing apparatus (not shown) and the pressures were indicated by manometers 13. Temperatures in the pressure vessel were controlled by an external heater 14.

First, maintaining the temperature of the liquid sodium 12 at 500°C and keeping constant the pressure of argon applied to the surface of the liquid sodium, the pressure of argon gas in the lower hollow of the vessel 15 was gradually increased to determine the pressure at which argon gas is released into the liquid sodium through the composite plug (i.e. holding-up pressure).

Next, keeping constant the pressure in the lower hollow of the vessel 15, the pressure exerted on the surface of the liquid sodium was gradually increased to determine the pressure at which the liquid sodium starts to pass through the composite plug (i.e. permeation prevention pressure).

The results are obtained as follows:
1. Holding pressure 1.26 kg/cm$^2$
2. Permeation prevention pressure 0.42 kg/cm$^2$ According to the calculations by combination of the above results with the operating parameters of a 300 MWe (electric output) class reactor, the following results were obtained:
1. Whole free space in a fuel element 6.24 cc
2. Pressure of liquid sodium (coolant) 1.578 kg/cm$^2$
3. Quantity of fission product gas per one day 1.056 CC at STP (Standard temperature & pressure)
4. Pressure of gas holding-up 2.84 kg/cm$^2$ Therefore, at the coolant temperature of 660°C (=933°K) the period of holding-up of fission product gas in the plenum is:

$$2.84 \times \frac{6.24 \times 1.037^*}{1.056} \times \frac{273}{933} = 5.09 \text{ (days)}$$

*Compensation in accordance with a temperature rise and thermal expansion of the cladding rod made of stainless steel.

On the other hand, if the temperature of the coolant decreases from 660°C until 250°C, the pressure of the coolant becomes 1.62 kg/cm$^2$ and the pressure within the fuel element becomes 1.59 kg/cm$^2$, and therefore it is impossible to prevent the permeation of the coolant into the fuel element through a conventional plug which is made of only a "wettable" porous material. To the contrary, according to the present invention, since the pressure for the coolant-permeation prevention is 0.42 kg./cm$^2$, the permeation is prevented until the pressure within the fuel element becomes 1.20 kg/cm$^2$ (=1.62−0.42).

EXAMPLE 2

Figure 3:
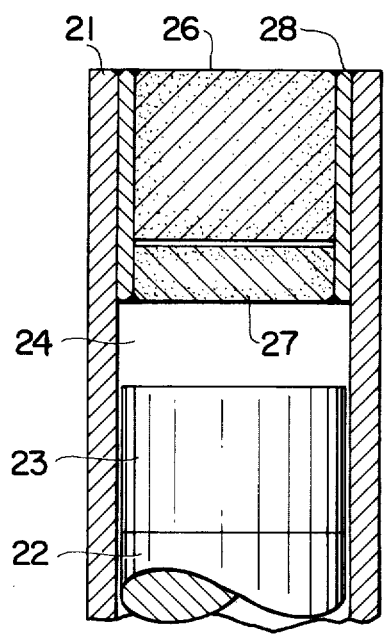
FIGS. 3 and 4 are vertical sectional views of different embodiments of the fuel elements according to the present invention.

In FIG. 3, the fuel element comprises, as well known, a cladding tube 21, a plenum 24, formed between a blanket fuel 23 and the bottom of a plug 27 which space absorbs the expansion of the fuel 22 along the axial direction of the fuel element, and a core fuel 22. The composite plug comprises a porous member 26 wettable wth liquid sodium and a porous member 27 non-wettable with the liquid sodium and it is fixed by securing a cylindrical member 28 to the cladding tube 21.

In this embodiment, as the wettable member a disk 26 of sintered stainless steel having a thickness of 5mm and one micron of a mean pore size, and as the non-wettable material a disk 27 of sintered alumina having a thickness of 2mm and 0.1 micron of a mean pore size were employed. The sintered stainless steel body was impregnated, prior to assembling, with a liquid sodium at 320°C in a heating vessel wherein the liquid sodium was placed on the sintered stainless steel body and pressurized by argon gas wth heating for 2 hours.

The thus prepared sintered stainless steel and sintered alumina were laminated and inserted into a stainless steel tube 28 of 0.1mm thickness, and the peripheries of the sintered bodies 26 and 27 were welded to the tube 28. Thereafter, the resulting assembly 26, 27, 28 was inserted into the cladding tube 21 and the other periphery of the tube 28 was welded to the cladding tube 21. In the above, the welding was carried out in an argon atmosphere, using a heat shielding block, so as to avoid oxidation and vaporization of impregnated sodium.

According to the above-described embodiment, the holding-up time of the fission product gas is extended and the permeation of the liquid sodium is effectively prevented.

EXAMPLE 3

Figure 4:
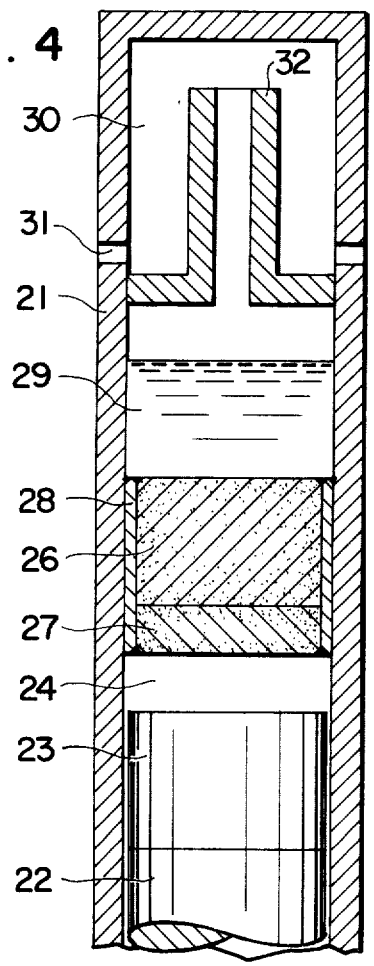

Referring to FIG. 4, members designated by the same reference numbers as in FIG. 3 are the same members in FIG. 3. This fuel element is provided with a so-called plug-bell type vent device. That is, the fuel element of FIG. 4 has a check valve conprising a low melting point metal pool 29 and a porous plug 26, 27 and 28, and a diving bell part 30 provided with a capillary tube 32 having a flange portion and a cap having apertures 31.

In this embodiment, as the low melting point metal 29, an alloy of 44.5% Pb and 55.5% Bi was employed; and the wettable member 26 and the non-wettable member 27 were the same as in Example 2 (FIG. 3). The pore size, methods of preparing the plug, welding, etc. were also the same as in Example 2. The holding-up time of the vent device according to the present invention was extended and the permeation was effectively prevented.

The advantages of the present invention may be exemplified as follows:

1. Extension of holding-up time and improvement in reliability.
2. Simplification of the construction.

While specific preferred embodiments of the present invention with variations have been set forth for purposes of illustration, further embodiments, variations and modifications are contemplated within the spirit and scope of the present invention as defined by the following claims.

What is claimed is:

1. A vented nuclear reactor fuel element having: a plenum for accumulation of fission product gases; and plug means for delaying the release of the fission product gases from the plenum into a liquid metal, said plug means consisting essentially of a first porous body wettable with a liquid metal, a second porous body non-wettable with the liquid metal, means mounting said second porous body between said first porous body and said plenum, and said first porous body being impregnated with the liquid metal and in contact with the liquid metal.

2. The vented nuclear fuel element of claim 1, wherein the liquid metal is a liquid sodium coolant, said first porous body being wettable with the liquid sodium and impregnated with the liquid sodium, and said second porous body being non-wettable with the liquid sodium and in contact with, at one face thereof opposite from the first porous body, the fission product gas within the plenum.

3. The vented nuclear fuel element of claim 1, wherein said first porous body is wettable with a low melting point metal and impregnated with the low melting point metal, and said second porous body is non-wettable with the low melting point metal; and further having a pool of the liquid low melting point metal in contact with said first porous body on the opposite side from said second porous body, at least one capillary tube adjacent and on the side of said low melting point metal opposite from said plug means, and a cap member surrounding said capillary tube on the side opposite from said low melting point metal for protecting the flowing of a coolant into the capillary tube and for allowing the release of the fission product gases through the plug means and the capillary tube.

4. The vented nuclear fuel element of claim 3, wherein the coolant is liquid sodium.

5. The vented nuclear fuel element of claim 2, wherein said mounting means is a cylindrical tube bonded to said first and second porous bodies with one face of said first porous body directly facing one face of said second porous body.

6. The vented nuclear fuel element of claim 5, wherein said one face of said first porous body is in direct contact with said one face of said second porous body.

* * * * *